US011816660B1

(12) United States Patent
Luera, III et al.

(10) Patent No.: US 11,816,660 B1
(45) Date of Patent: *Nov. 14, 2023

(54) METHODS AND SYSTEMS FOR MAKING A PRE-PAYMENT FROM A VEHICLE

(71) Applicant: United Services Automobile Association (USAA), San Antonio, TX (US)

(72) Inventors: Leopoldo Luera, III, San Antonio, TX (US); Charles Bear, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 128 days.

This patent is subject to a terminal disclaimer.

(21) Appl. No.: 17/411,537

(22) Filed: Aug. 25, 2021

Related U.S. Application Data

(63) Continuation of application No. 17/031,514, filed on Sep. 24, 2020, now Pat. No. 11,138,592, which is a continuation of application No. 16/391,103, filed on Apr. 22, 2019, now Pat. No. 10,817,870, which is a continuation of application No. 15/441,071, filed on Feb. 23, 2017, now Pat. No. 10,475,028, which is a
(Continued)

(51) Int. Cl.
*G06Q 20/36* (2012.01)
*G06Q 20/32* (2012.01)

(52) U.S. Cl.
CPC ......... *G06Q 20/367* (2013.01); *G06Q 20/327* (2013.01)

(58) Field of Classification Search
CPC .... G06Q 20/367; G06Q 20/327; G06Q 20/32; G06Q 20/3223; G06Q 20/3224; G06Q 20/3278; G07B 15/02; G08G 1/146; H04B 5/00; H04B 1/034; G07F 7/0893
See application file for complete search history.

(56) References Cited

U.S. PATENT DOCUMENTS

| 6,249,772 | B1 | 6/2001 | Walker |
| 6,690,268 | B2 | 2/2004 | Schofield et al. |
| 6,711,474 | B1 | 3/2004 | Treyz et al. |
| (Continued) | | | |

OTHER PUBLICATIONS

U.S. Appl. No. 61/481,036, filed Apr. 29, 2011, Dedicated Short-Range Communications (DSRC) To Make Payments From Vehicles Using Vehicle-Based, Cloud-Based or Smartphone-Based Mobile Wallets.
(Continued)

*Primary Examiner* — Cindy Trandai
(74) *Attorney, Agent, or Firm* — Perkins Coie LLP

(57) ABSTRACT

Methods and systems are provided for making a pre-payment. In some embodiments, a user is provided with a mobile wallet; information populating at least one payment instrument to the mobile wallet is received; information that the mobile wallet is usable with respect to the vehicle is received; information that the mobile wallet has been presented by the vehicle to a payment location is received; an authorized pre-payment corresponding to items or an amount associated with the payment location is received; a token is received from the user at the payment location; and the pre-payment is settled using the payment instrument.

20 Claims, 7 Drawing Sheets

Related U.S. Application Data continuation of application No. 13/460,380, filed on Apr. 30, 2012, now Pat. No. 9,602,164.

(60) Provisional application No. 61/481,036, filed on Apr. 29, 2011.

(56) References Cited

U.S. PATENT DOCUMENTS

| | | |
|---|---|---|
| 7,966,215 B1 | 6/2011 | Myers et al. |
| 8,041,338 B2 | 10/2011 | Chen et al. |
| 8,195,576 B1 | 6/2012 | Grigg et al. |
| 8,348,154 B2 | 1/2013 | Sims et al. |
| 9,317,849 B2 | 4/2016 | Pitroda et al. |
| 9,330,388 B2 | 5/2016 | Pitroda et al. |
| 9,602,164 B1 | 3/2017 | Luera, III et al. |
| 10,475,028 B1 | 11/2019 | Luera, III et al. |
| 10,817,870 B1 | 10/2020 | Luera, III et al. |
| 2001/0042007 A1 | 11/2001 | Klingle |
| 2002/0120499 A1 | 8/2002 | Liu et al. |
| 2002/0165789 A1 | 11/2002 | Dudek et al. |
| 2003/0126331 A1 | 7/2003 | Levy |
| 2004/0041022 A1* | 3/2004 | Minowa ............ G06Q 30/0273 235/383 |
| 2004/0139008 A1 | 7/2004 | Mascavage |
| 2004/0214597 A1* | 10/2004 | Suryanarayana .. G06Q 20/3674 455/552.1 |
| 2005/0240343 A1 | 10/2005 | Schmidt et al. |
| 2006/0047835 A1 | 3/2006 | Greaux |
| 2007/0225912 A1* | 9/2007 | Grush ................ G07B 15/063 701/469 |
| 2007/0287413 A1* | 12/2007 | Kleitsch ................ H04L 12/14 455/466 |
| 2008/0056495 A1 | 3/2008 | Eguchi et al. |
| 2008/0207203 A1 | 8/2008 | Arthur et al. |
| 2008/0223918 A1 | 9/2008 | Williams et al. |
| 2008/0255947 A1 | 10/2008 | Friedman |
| 2009/0063312 A1 | 3/2009 | Hurst |
| 2009/0119190 A1 | 5/2009 | Realini |
| 2009/0132813 A1 | 5/2009 | Schibuk |
| 2009/0150073 A1 | 6/2009 | Caraballo |
| 2009/0187488 A1 | 7/2009 | Shamilian |
| 2009/0210308 A1* | 8/2009 | Toomer ................ G06Q 20/40 705/16 |
| 2009/0289109 A1 | 11/2009 | Sims et al. |
| 2010/0057624 A1* | 3/2010 | Hurt ...................... G06Q 20/32 705/76 |
| 2010/0114731 A1 | 5/2010 | Kingston et al. |
| 2010/0114734 A1 | 5/2010 | Giuli et al. |
| 2010/0125510 A1 | 5/2010 | Smith et al. |
| 2010/0276484 A1 | 11/2010 | Banarjee et al. |
| 2010/0280956 A1* | 11/2010 | Chutorash ............ G07F 13/025 705/64 |
| 2011/0022472 A1 | 1/2011 | Zon |
| 2011/0029458 A1* | 2/2011 | Gworek ............ G06Q 30/0206 705/400 |
| 2011/0057025 A1* | 3/2011 | Denzer .................. G06Q 20/28 235/375 |
| 2011/0136429 A1 | 6/2011 | Ames et al. |
| 2011/0195726 A1 | 8/2011 | Horvitz et al. |
| 2011/0246372 A1* | 10/2011 | Zloth .................... G07F 7/1016 705/17 |
| 2011/0258122 A1* | 10/2011 | Shader .................. G06Q 20/14 705/67 |
| 2012/0130872 A1 | 5/2012 | Baughman et al. |
| 2012/0197740 A1 | 8/2012 | Grigg et al. |
| 2012/0197743 A1 | 8/2012 | Grigg et al. |
| 2012/0271712 A1 | 10/2012 | Katzin et al. |
| 2012/0290376 A1 | 11/2012 | Dryer |
| 2013/0046692 A1 | 2/2013 | Grigg et al. |
| 2013/0054336 A1 | 2/2013 | Graylin |
| 2013/0238455 A1 | 9/2013 | Laracey |
| 2014/0081732 A1 | 3/2014 | Farmer et al. |

OTHER PUBLICATIONS

U.S. Appl. No. 13/460,380 U.S. Pat. No. 9,602,164, filed Apr. 30, 2012 Mar. 21, 2017, Methods and Systems for Making a Pre-Payment From a Vehicle.

U.S. Appl. No. 15/441,071 U.S. Pat. No. 10,475,028, filed Feb. 23, 2017 Nov. 12, 2019, Methods and Systems for Making a Pre-Payment From a Vehicle.

U.S. Appl. No. 16/391,103 U.S. Pat. No. 10,817,870, filed Apr. 22, 2019 Oct. 27, 2020, Methods and Systems for Making a Pre-Payment From a Vehicle.

U.S. Appl. No. 17/031,514, filed Sep. 24, 2020, Methods and Systems for Making a Pre-Payment From a Vehicle.

* cited by examiner

METHODS AND SYSTEMS FOR MAKING A PRE-PAYMENT FROM A VEHICLE

CROSS REFERENCE TO RELATED APPLICATIONS

This application is a continuation of U.S. patent application Ser. No. 17/031,514 filed on Sep. 24, 2020, now allowed, which is a continuation of U.S. patent application Ser. No. 16/391,103 entitled "METHODS AND SYSTEMS FOR MAKING A PRE-PAYMENT FROM A VEHICLE," filed on Apr. 22, 2019, issued as U.S. Pat. No. 10,817,870 on Oct. 27, 2020, which is a continuation of U.S. patent application Ser. No. 15/441,071 entitled "METHODS AND SYSTEMS FOR MAKING A PRE-PAYMENT FROM A VEHICLE," filed on Feb. 23, 2017, issued as U.S. Pat. No. 10,475,028 on Nov. 12, 2019, which is a continuation of U.S. patent application Ser. No. 13/460,380 entitled "METHODS AND SYSTEMS FOR MAKING A PRE-PAYMENT FROM A VEHICLE," filed on Apr. 30, 2012, issued as U.S. Pat. No. 9,602,164 on Mar. 21, 2017, which claims priority to U.S. Provisional Patent Application No. 61/481,036, entitled "Dedicated Short-Range Communications (DSRC) To Make Payments From Vehicles Using Vehicle-Based, Cloud-Based or Smartphone-Based Mobile Wallets", filed on Apr. 29, 2011, all of which are hereby incorporated by reference herein in their entireties.

TECHNICAL FIELD

Embodiments of the present invention provide various systems and methods for making payments from vehicles in connection with a mobile wallet. More particularly, disclosed embodiments relate to methods and systems for making a pre-payment from a vehicle using a mobile wallet.

BACKGROUND

Whether it be pulling into a fast food restaurant, or parking in a public lot and trying to find the right change to feed a traffic meter, consumers are constantly looking for ways to save time and effort. Recently, consumers have leveraged payments in a mobile environment. For example, consumers may use digital wallets instead of physical wallets, and digital payment devices in place of physical payment instruments. Mobile wallets may be used in connection with vehicles. In accordance with various embodiments, a consumer may link a vehicle to a mobile wallet and make payments from the vehicle through dedicated short-range communications (DSRC) or other protocol.

BRIEF SUMMARY

Embodiments of the present invention provide various systems and methods for making payments from vehicles in connection with a mobile wallet. More specifically, in various embodiments, consumers may make a pre-payment from a vehicle in connection with a mobile wallet. In some embodiments, a mobile wallet is provided to the user, information populating at least one payment instrument to the mobile wallet is received from the user; information that the mobile wallet is usable with respect to a vehicle is received; signals that the mobile wallet has been presented to a payment location are received, the mobile wallet being presented to the payment location by the vehicle; an authorized pre-payment corresponding to one or more items or an amount is received from the user, the authorized pre-payment being associated with the payment location; a selection of a payment instrument from the mobile wallet for settlement of the pre-payment is received from the user; a token is received from the user at the payment location; and in response to receiving the token, the pre-payment is settled using the payment instrument.

In some embodiments, in response to receiving the pre-payment, the user is provided with the token. The token may change on a transaction-per-transaction basis. In some embodiments, the token is a membership number associated with the user. In some embodiments, the token identifies the user and the pre-payment to the payment location.

In some embodiments, possible payment locations for presentment of the mobile wallet are identified, presented to the user on a user interface, and a selection of the payment locations is received. In some embodiments, the user is provided with one or more discounts based on the payment location. In some embodiments, items associated with the payment location are determined, the user is provided with a selectable list of the items associated with the payment location, a selection of a least one of the items is received, and the user is provided a total cost associated with the selected items. In some embodiments, the form of pre-payment is at least one of: a credit card, a pre-paid card, a stored value card, and a gift card.

In some embodiments, the mobile wallet is integral with the vehicle. In some embodiments, the mobile wallet is tethered to or docked with the vehicle. In some embodiments, the mobile wallet is linked to the vehicle from a mobile device using near-field communication. In some examples, the mobile wallet is hosted remotely from the vehicle. In some embodiments, the vehicle is linked to the payment location using dedicated short-range communications.

In some embodiments, the mobile wallet contains personal information from the user, which personal information is usable by the user for identifying the user to the payment location. In some embodiments, a provider of the mobile wallet is a membership organization and the user is a member of the membership organization. In some embodiments, the payment location is a fixed payment location. In some embodiments, the token provides verification for the payment to be settled. In some embodiments, personal identification from the mobile device is used to access a secure area using the vehicle, and the personal identification is presented to an access control device of the secure area by the vehicle.

BRIEF DESCRIPTION OF THE DRAWINGS

Embodiments of the present invention will be described and explained through the use of the accompanying drawings in which.

Figure 1:
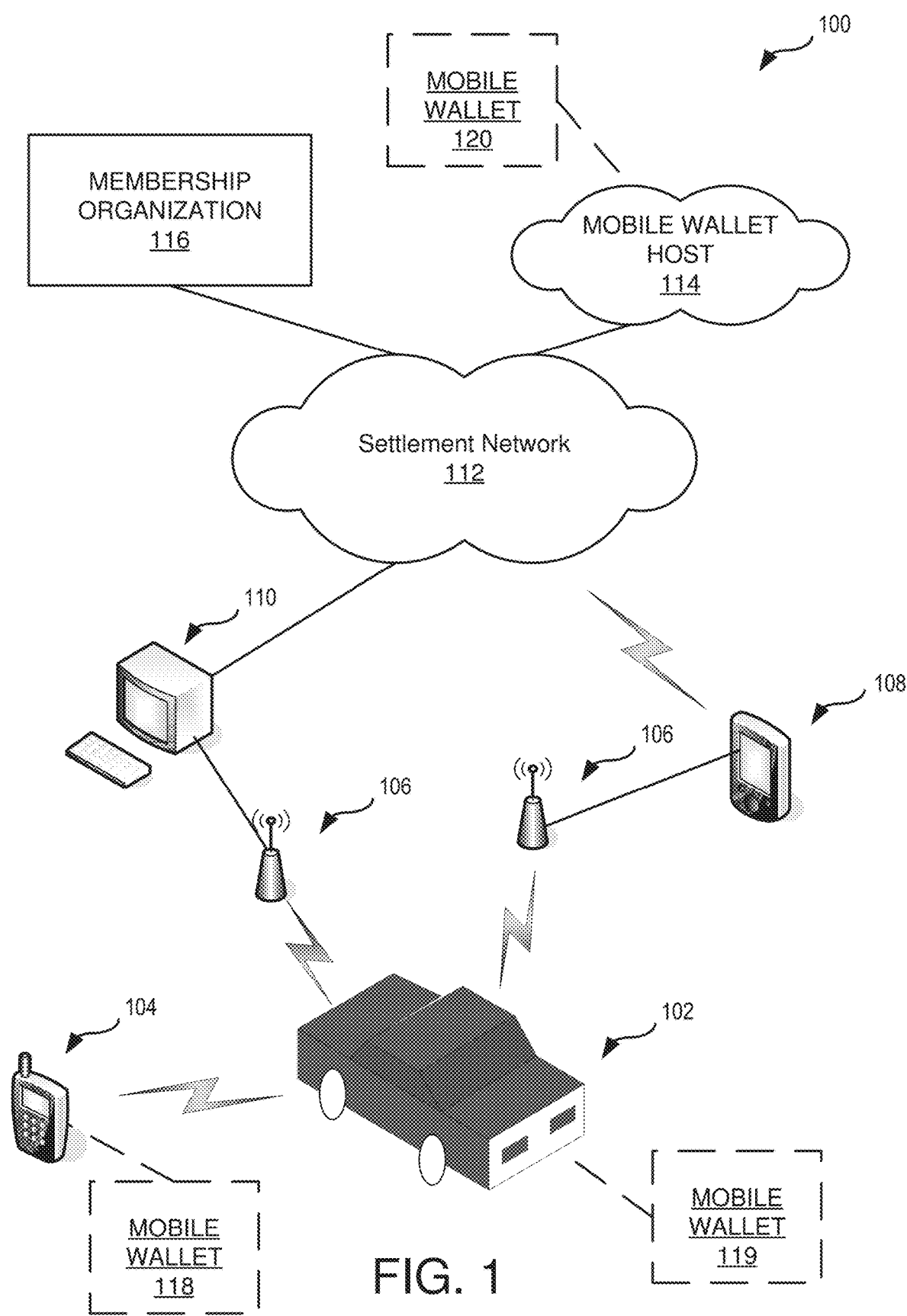
FIG. 1 illustrates an example of an operating environment in which some embodiments of the present invention may be utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. The order of the operations may be altered, and operations from one embodiment may be combined with operations associated with other embodiments. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

Embodiments of the present invention generally relate to making payments from a vehicle using a mobile wallet. More specifically, various embodiments of the present invention relate to methods and systems for making a pre-payment from a vehicle. Many times, consumers know what items they plan to purchase or a specific amount the consumer is willing to spend before or at the time the consumer arrives at a store. Using the methods and systems provided herein, the user may make a pre-payment from their vehicle and not waste time looking for a payment instrument or waiting in a traditional check-out line.

In accordance with various embodiments, users may be provided a mobile wallet, and the user supplies information such that the mobile wallet is populated with one or more payment instruments. The mobile wallet may be linked with a vehicle through the vehicle information system for example. A user of the system may drive to a payment location such as a payment location in Home Depot® to buy items such as light bulbs. When in Home Depot's parking lot, or other acceptable range for the vehicle to link with a payment station in Home Depot® to present the mobile wallet, the mobile wallet is presented to the payment location. The user may then make a pre-payment corresponding to light bulbs, and/or the user may specify a prepayment amount. The pre-payment may specify the number and brand of light bulbs. If there is more than one payment instrument available in the mobile wallet, the user may select a payment instrument to be used for the pre-payment. The user may be provided with a token associated with the user or with the particular transaction. The user may then go inside Home Depot®, collect the light bulbs or other items, and go to a checkout lane that is designated for customers who have pre-paid. The pre-paid checkout process includes minimal interaction and time for the user. The user may be required to show identification or input a token. The identification or inputting of a token may provide verification of the pre-payment amount or items. Or the user may input the token and verify the pre-payment, or make modifications to the pre-payment as needed. After the token is received, the payment is settled using the selected payment instrument. In some embodiments, the user may go to a typical checkout lane, in which case the same or similar process would be used, but the user may have the inconvenience of a longer line. In either scenario, the user's checkout process is more efficient and convenient.

Additionally, in some embodiments, the payment location may be identified using any method known in the art. In some scenarios, the payment location may be identified by the use of GPS technology incorporated with the user device or with the vehicle information system. If more than one payment location is identified within a range the mobile wallet can be presented, the user may be provided, through the mobile device or the vehicle information system, a selectable list of the possible payment locations for prepayment. The user may be provided a list of items associated with the payment location. The user can select the items corresponding to the pre-payment. The user may be provided a list of coupons and/or discounts associated with the payment location.

FIG. 1 illustrates an example of an operating environment 100 in which some embodiments of the present invention may be utilized. The embodiments of the present invention illustrated in FIG. 1 allow users to make payments from a vehicle 102. The payments are settled from a mobile wallet 118, 119, 120, which may be integral with the vehicle 102 (such as the mobile wallet 119), which may reside on a smartphone 104 (a smartphone being a cellular phone that has capabilities and features such as, but not limited to, internet access, a full keyboard, email access, Wi-Fi connection capabilities, BLUETOOTH connectivity, or any other functionality of a computer), tablet computers (a portable computer having a touch interface) or other mobile device linked to the vehicle 102 (such as the mobile wallet 118), which may be hosted "in the cloud" 114 (such as the mobile wallet 120), or the like. Other mobile devices may include cellular phones, netbooks, or laptops possibly with a wireless connection (such as an 802.11a/b/g connection or mobile broadband connection, such as via a 3G or 4G wireless network). In some embodiments, the mobile wallet is enabled via an application that the user downloads onto the mobile device.

If the smartphone 104 contains the mobile wallet 118, the mobile wallet may be linked to the vehicle 102 via Bluetooth or other appropriate wireless link, hardwire connected to the vehicle 102, docked in a specially-designed docking station integral to the vehicle 102, or the like. The mobile wallet then may be accessible through a vehicle information system, allowing the user to access the mobile wallet via voice, vehicle-based controls, or the host device itself. Linking the mobile wallet 118 to the vehicle may include an appropriate handshake protocol and may employ appropriate security measures to prevent unauthorized detection and subsequent use of information transferred from the mobile wallet to the vehicle. In some embodiments, mobile wallet 118 can be linked with a specific vehicle such that linking can only occur with the specified vehicle and no other.

In usage, as a vehicle operator approaches a payment location, such as the mobile payment station 108 or the fixed payment station 110, the vehicle may link to the payment location wirelessly. Wireless linking can include the use of long range and short range communication systems such as radio waves, microwaves, visible and ultraviolet light, among others. In some embodiments, for example, the vehicle may link to the payment location via a wireless access point 106 using short range communications such as dedicated short-range communications (DSRC), near-field communication (NFC), Bluetooth or other suitable protocol. The mobile wallet 118 is then accessible to the payment location. Alternatively, vehicle and/or mobile wallet identification may be passed from the vehicle to the payment location so that a cloud-hosted mobile wallet 120 may be accessed by the payment location.

The payment location may comprise a mobile payment station 108 or a fixed payment station 110. Mobile payment stations include, for example, event parking, traffic enforcement, parking meters, mobile vendors, and the like. Fixed payment stations include, for example, parking garage entrances and exits, drive-thrus (fast food, laundry/dry cleaners, pharmacies, etc.), toll ways, point of sale devices inside merchant locations or other retail payment receiving devices, and the like. Other payment stations, such as, for example, roadway sensors (not shown), may comprise both fixed and mobile payment stations.

Both payment locations interface with a settlement network 112, which may settle payments in any of a number of ways (credit/debit card, virtual currency, etc.). Conveniently, the settlement network 112, or other appropriate network, may provide access to an organization such as a membership organization 116, which may provide benefit to the user of the mobile wallet or to merchants who accept payments from a member's mobile wallet. Such benefits are more fully described in co-pending, commonly assigned U.S. Provisional Patent Application No. 61/476,073, which application is incorporated herein in its entirety by reference. The membership organization 116 may be any organization that provides certain financial services. For example, membership organization may provide banking, insurance, wealth management, and any of a number of other services. Membership organization 116 may provide a mobile wallet to its members, which mobile wallet may be used as described herein. Membership organization 116 may include various databases. The databases may include information about the members including membership identification numbers, financial history, financial account information, employment related information, purchasing history, and other information.

Figure 2:
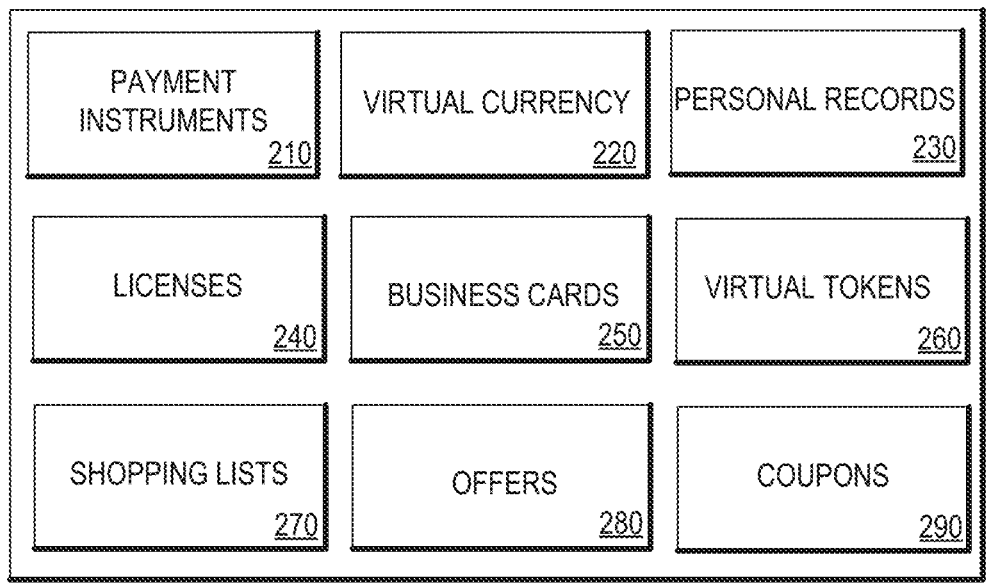
FIG. 2 depicts an exemplary mobile wallet.

FIG. 2 depicts an exemplary mobile wallet 200 illustrating exemplary components that may be included in a mobile wallet. According to the embodiment shown in FIG. 2, the mobile wallet 200 may include payment instruments 210, such as virtual credit cards, debit cards, gift cards, and the like; virtual currency 220; personal records 230, such as medical records, personal property titles, and the like; licenses 240, such as drivers licenses, employee IDs, military IDs, and the like; business cards 250; virtual tokens 260, such as public transit tokens or the like; shopping lists 270, which may include wish lists and the like; offers 280; and coupons 290.

Figure 3:
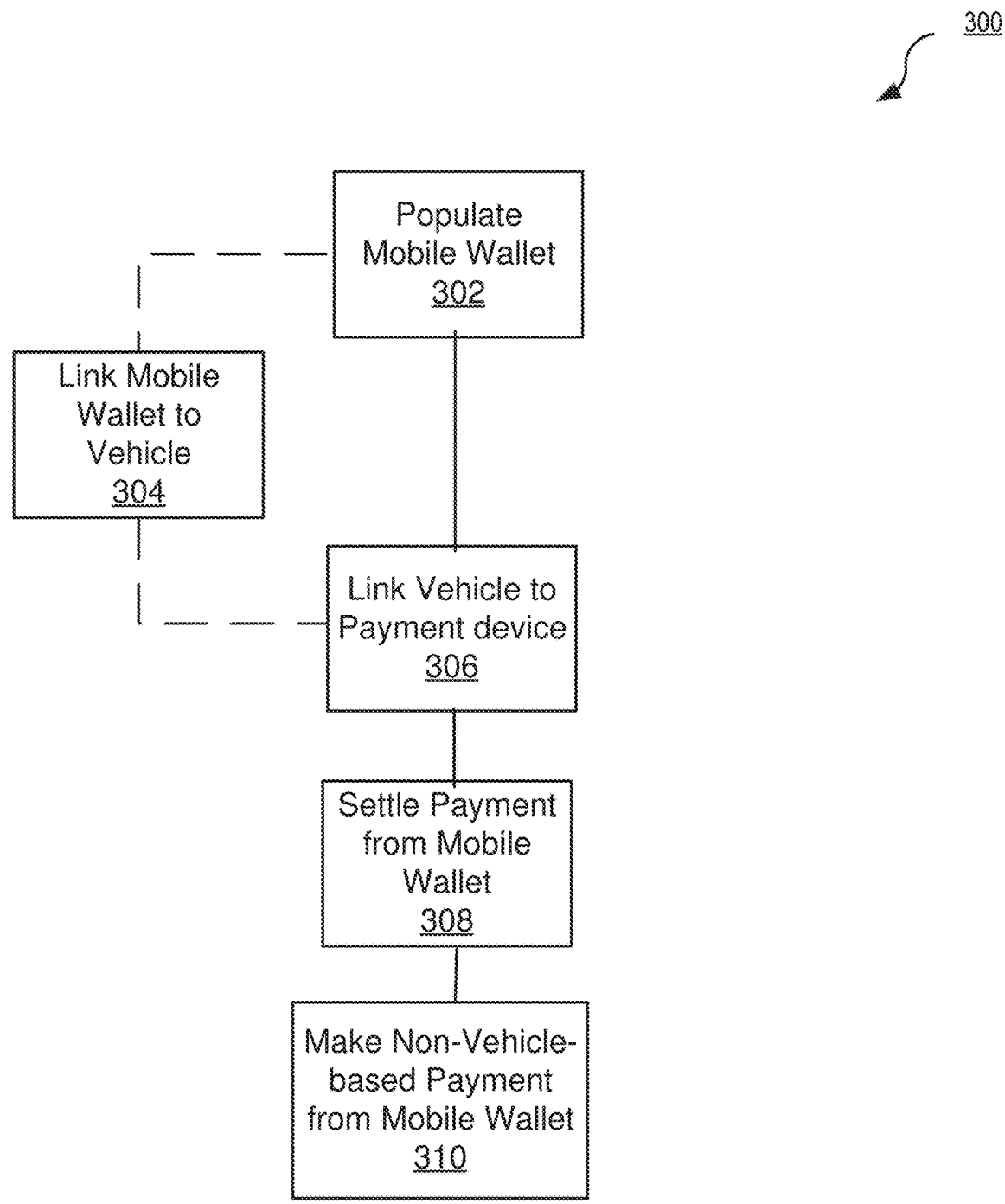
FIG. 3 is a flowchart depicting methods of making payment from a vehicle in accordance with embodiments of the present invention.

FIG. 3 depicts a method of making a payment from a vehicle, which method may be embodied in the system 100 of FIG. 1 and is usable in combination with a mobile wallet, such as the mobile wallet 200 of FIG. 2. The method begins at FIG. 302, wherein a user is provided with a mobile wallet and the mobile wallet is populated with items, such as one or more of the items depicted in the mobile wallet 200 of FIG. 2. The mobile wallet may be hosted on a mobile device, may be integral with a vehicle, or may be hosted externally from the vehicle, such as in the "cloud."

At block 304, the mobile wallet is linked to the vehicle if it is not otherwise already associated with the vehicle. Linking the wallet to the vehicle may include docking a mobile device comprising the mobile wallet to the vehicle, tethering the mobile device to the vehicle, linking the mobile device to the vehicle using, for example, Bluetooth or other suitable protocol, or the like. Once linked to the vehicle, the mobile device may be accessible by the vehicle information system, such as Ford Sync, Toyota EnTune, or other similar branded or non-branded vehicle information systems, thereby allowing the user to have hands-free access to the mobile wallet or have access to it through vehicle controls. Alternatively, the vehicle, through, for example, its vehicle control system, is otherwise "pointed" to an externally-hosted mobile wallet.

At block 306, the vehicle encounters a payment location and is linked to it using near-field communications (NFC), dedicated short-range communications (DSRC), or other suitable protocol. The linking may include an appropriate handshake protocol and may employ appropriate security measures to prevent unauthorized detection and subsequent use of information transferred from the mobile wallet to the payment location.

Using a combination of one or more of vehicle controls, hands-free controls, the vehicle information system, the mobile device, and the like, information is exchanged between the mobile wallet and the payment location to thereby facilitate the payment at block 308. In this way, a payment authorization is wirelessly sent from the vehicle or mobile wallet to the payment location.

At block 310, the mobile wallet may be used for another payment, which payment is made without the use of the vehicle.

Figure 4:
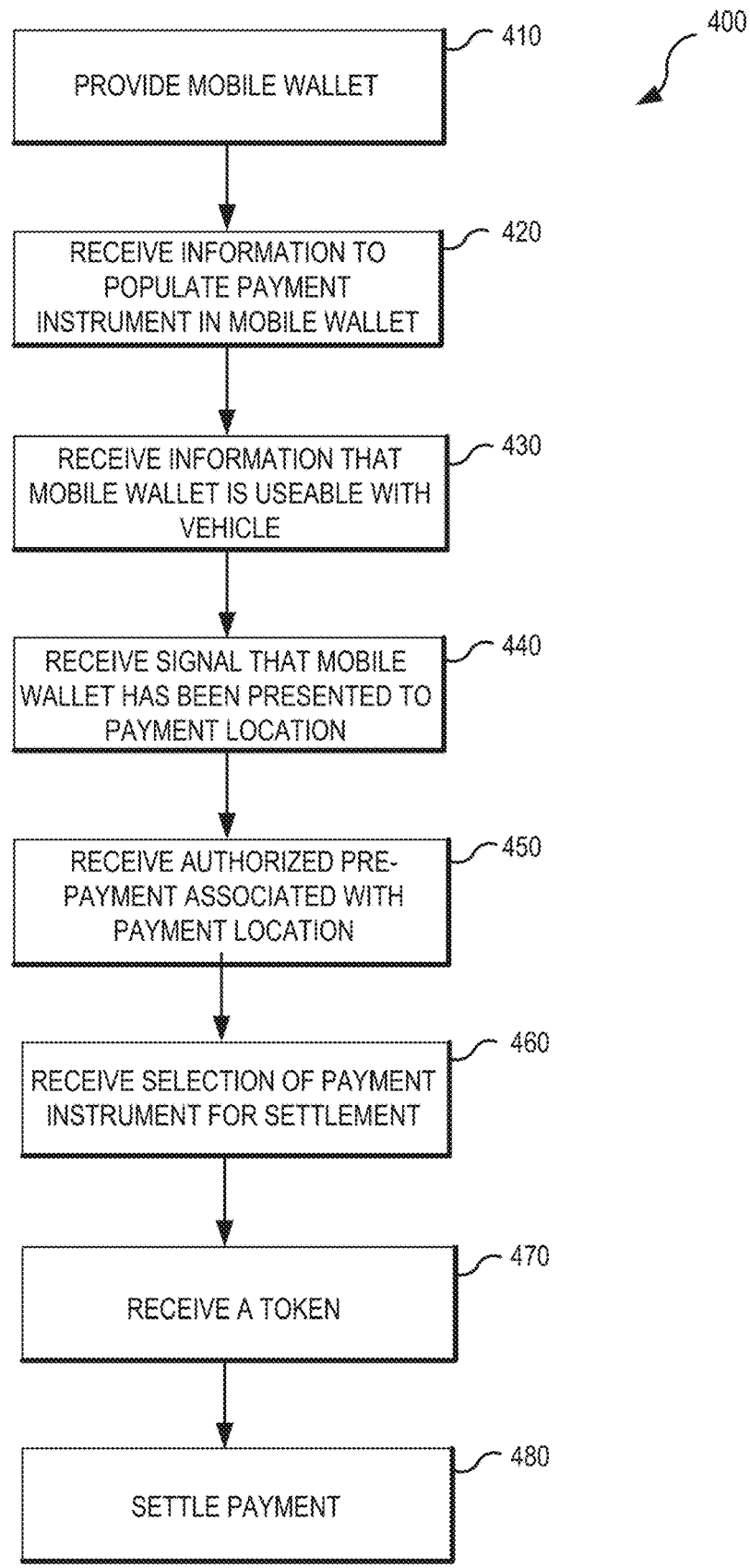
FIG. 4 is a flowchart depicting methods of making payment from a vehicle in accordance with embodiments of the present invention.

FIG. 4 depicts a method 400 of making a payment from a vehicle, which method may be embodied in the system 100 of FIG. 1 and is usable in combination with a mobile wallet, such as the mobile wallet 200 of FIG. 2.

In block 410, a mobile wallet is provided to the user. The mobile wallet may reside on the user's computing device, or it may be integral with the vehicle. The mobile wallet may be enabled by a mobile wallet application that is downloaded to a mobile device. The mobile wallet may be tethered to or docked with the vehicle as described in regards to FIG. 1. Or the mobile wallet may be hosted remote from the vehicle, such as on a smartphone that is remote from the vehicle. The mobile wallet may contain personal information from the user, which may be used to identify the user to a payment location or to any other device.

In block 420, information is received to populate at least one payment instrument to the mobile wallet. The information may include a credit card number, CVV, name on the credit card., etc. Or the information may be extracted from a user-provided image of a payment instrument including the front and the back of the payment instrument. In some embodiments, the payment instrument and/or the mobile wallet may be provisioned to the mobile device such that the payment instruments may be useable using near-field communications.

In block 430, information is received that the mobile wallet is useable with the vehicle. The mobile wallet, including the payment instruments may be linked to the vehicle from the mobile device using near field communications, for example. In some embodiments, personal identification from the mobile wallet or mobile device is presented to an access control device of a secure area to access the secure area using the vehicle.

In block 440, signals are received indicating that the mobile wallet has been presented to the payment location. When the vehicle approaches one or more payment locations associated with different merchant locations, a transceiver in the vehicle may send and receive signals from the various payment locations. The vehicle may be linked to the payment location using dedicated short-range communication or a similar protocol. The mobile wallet may be presented to the payment location by the vehicle in this way. In some embodiments, the vehicle information system or the mobile device (using a mobile wallet or mobile wallet application) is used to detect and/or identify possible payment locations for presentment of the mobile wallet. For example, the user may be driving or parked in an area where there are several possible payment locations in the proximity of the vehicle. The user may be presented with a list or other visual representation of the possible payment locations on a user interface of the mobile device or vehicle information system, and the user may select one or more of the payment locations for presentation of the mobile wallet. In some embodiments, once the payment location has been identified and/or selected, the user may be provided with one or more discounts or coupons to the payment location to be applied during payment settlement.

In block 450, an authorized pre-payment is received for the payment location. The pre-payment may correspond to an amount or items. In some embodiments, the mobile wallet, the mobile wallet application, or the vehicle information system may determine the characteristics associated with the payment location, such as type of payment location or type of merchandise sold at the merchant location. The user may be provided with a list or display of items or merchandise associated with the payment location. The list may be selectable and displayed on a webpage via a user interface of the mobile device or the vehicle information system. The user may select one or more items for purchase. A total cost of the items may be provided to the user. This may assist the user in determining the authorized pre-payment amount or the pre-payment items.

In response to receiving the authorized pre-payment, the user may be provided with a token that is presented by the user to the payment location before the user exits the merchant location. The token may be provided through an email, text message, website, mobile wallet application, or vehicle information system for example. The token may include information identifying the transaction and/or the user such as a series of numbers and/or letters, a quick-response code, or membership identification number. The token may change on a transaction-per-transaction basis. The token may be a hardware-type token. Such hardware-type token may use Near Field Communication technology, such as from a smartphone. In some embodiments, the token need not be provided to the user for every transaction, such as tokens that are particular to the user, for example a membership identification number, personal identification number, or photo identification. The token may identify the user and the pre-payment and may be presented by the user at the payment location.

In block 460, a selection of one or more of the payment instruments to be used for settlement are received. In some embodiments the form of pre-payment is a credit card, a pre-paid card a stored value card, or a gift card associated with the mobile wallet.

In block 470, a token provided by the user from the payment location is received. The user may enter into the merchant location and collect items for purchase. The user may be required to tender a token at the payment location prior to exiting the merchant location. In some embodiments, the user may enter into a special checkout lane. The token may serve as a verification that the pre-payment corresponding to the amount or items is correct and that the pre-payment should be settled. If the user collected items in excess of the pre-paid items or the pre-paid amount, the user may authorize additional funds, or choose a different payment instrument.

In block 480, in response to receiving the token, the pre-payment made from the vehicle is settled with the payment location.

Figure 5:
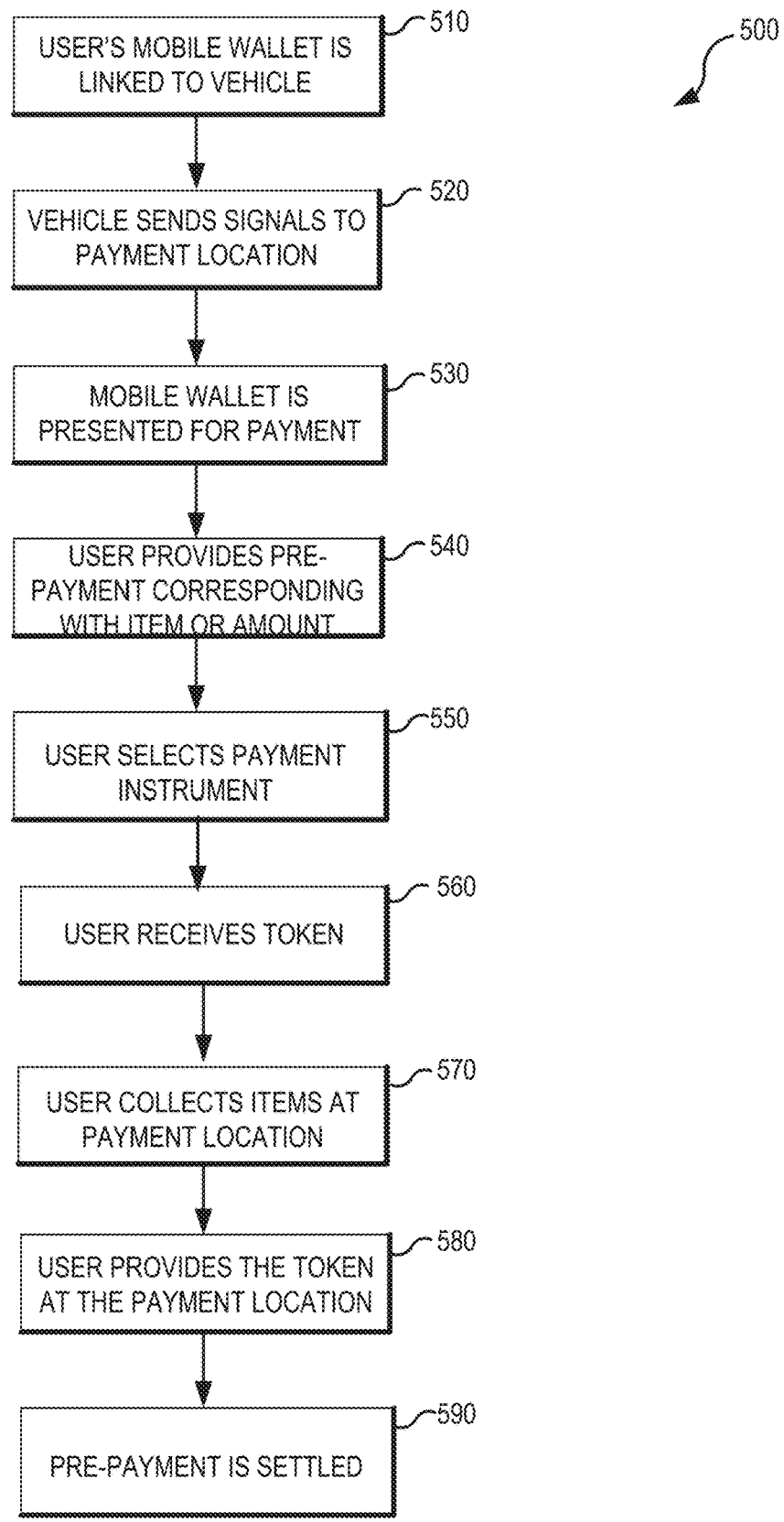
FIG. 5 is a flowchart depicting methods of making payment from a vehicle in accordance with embodiments of the present invention.

FIG. 5 depicts a method of making a payment from a vehicle, which method may be embodied in the system 100 of FIG. 1 and is usable in combination with a mobile wallet, such as the mobile wallet 200 of FIG. 2.

In block 510, the user's mobile wallet is linked to the vehicle. In block 520, the vehicle sends signals to a payment location. In block 530, the mobile wallet is presented to the payment location for payment by the vehicle. In block 540, the user authorizes pre-payment corresponding with an item and/or amount. In block 550, the user selects a payment instrument in the mobile wallet to be used in settling the pre-payment. In block 560, the user receives a token to be provided at the payment location to verify the pre-payment before settlement. The user may receive the token via a mobile wallet application on the mobile device or through the vehicle information system, or by way of email, text message, phone message, a posting on an internet website, for example. In block 570, the user collects items at the payment location. When the user has collected items for purchase, the user may simply provide the token and exit the payment location, indicated by block 580. In block 590, in response to receiving the token, the pre-payment made by the vehicle is settled using the payment instrument selected by the user.

Figure 6:
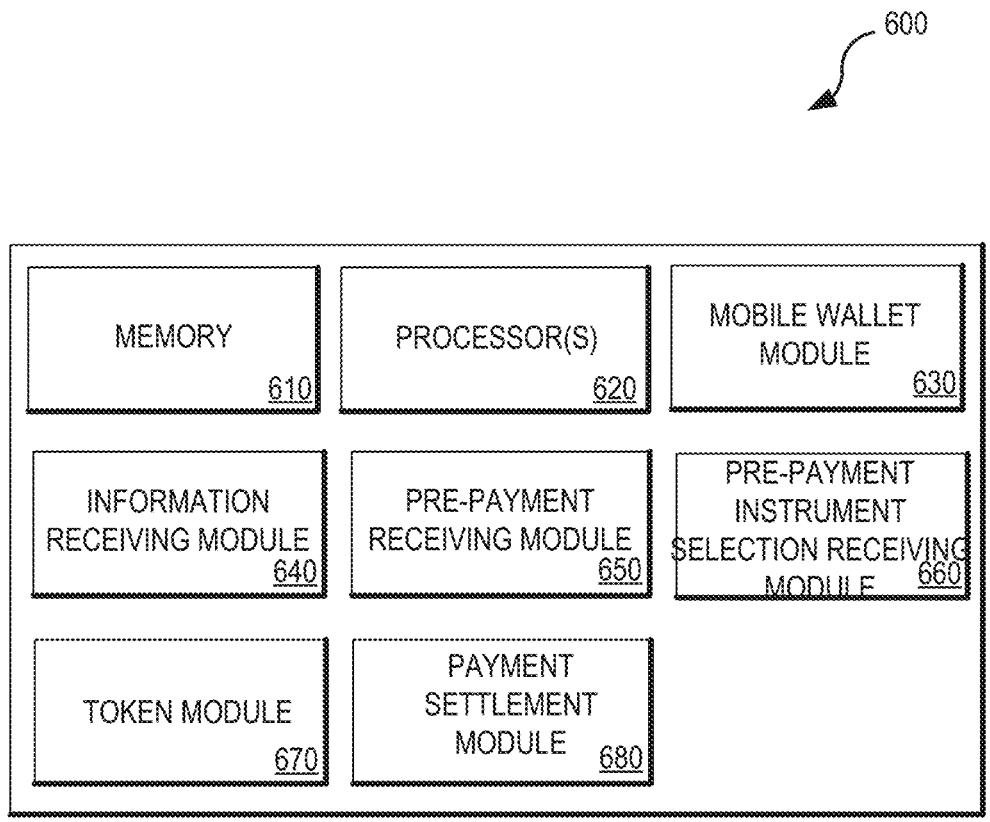
FIG. 6 is a block diagram illustrating exemplary components that may be included in a system for making a payment from a vehicle using a mobile wallet.

FIG. 6 is a block diagram illustrating exemplary components that may be included in a system for making a pre-payment from a vehicle using a mobile wallet. According to the embodiments shown in FIG. 6, the mobile financial management system 600 may include memory 610, one or more processors 620, mobile wallet module 630, information receiving module 640, pre-payment receiving module 650, pre-payment instrument selection receiving module 660, token module 670, and payment settlement module 680.

Other embodiments of the present invention may include some, all, or none of these modules and components along with other modules, applications, and/or components. Still yet, some embodiments may incorporate two or more of these modules into a single module and/or associate a portion of the functionality of one or more of these modules with a different module. For example, in one embodiment, the functionality associated with the pre-payment receiving module 650 and pre-payment instrument selection receiving module 660 may be incorporated into a single pre-payment module. As another example, in one embodiment, the token module 670 can be separated into a token providing module for providing a token to the user and a token receiving module for receiving and verifying the token.

Memory 610 can be any device, mechanism, or populated data structure used for storing information. In accordance with some embodiments of the present invention, memory 610 can encompass any type of, but is not limited to, volatile memory, nonvolatile memory and dynamic memory. For example, memory 610 can be random access memory, memory storage devices, optical memory devices, media magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact disks, DVDs, and/or the like. In accordance with some embodiments, memory 610 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 610.

Memory 610 may be used to store instructions for running one or more applications or modules on processor(s) 620. For example, memory 610 could be used in one or more embodiments to house all or some of the instructions needed to execute the functionality of mobile wallet module 630, information receiving module 640, pre-payment receiving module 650, pre-payment instrument selection receiving module 660, token module 670, and payment settlement module 680.

Mobile wallet module 630 may be configured to provide a mobile wallet to a user. The mobile wallet may be provided to the user via an application downloadable by the user and the mobile wallet may reside on a mobile device of the user and may be integral with the vehicle. The mobile wallet module 630 may be further configured to receive from the user, information populating at least one payment instrument to the mobile wallet. The information may be extracted from an image of the payment instrument. The mobile wallet module 630 may be further configured to identify possible payment locations for presentment of the mobile wallet, present the possible payment locations to the user, and receive a selection of the payment locations. Additionally, the mobile wallet module 630 may be configured to provide the user with one or more discounts based on the payment location. The mobile wallet may be further configured to determine the characteristics associated with the payment location, provide the user with a selectable list of items associated with the payment locations, receive a selection of the items, and provide a total cost associated with the selected items.

Information receiving module 640 may be configured to receive information that the mobile wallet is linked with or usable with respect to a vehicle. Information receiving module 640 may be further configured to receive signals that the mobile wallet has been presented to a payment location.

Pre-payment receiving module 650 may be configured to receive an authorized pre-payment associated with the payment location that the mobile wallet has been presented to. The pre-payment may correspond to items, or an amount.

Pre-payment instrument selection receiving module 660 may be configured to receive a selection of payment instruments from the mobile wallet that may be used to settle the pre-payment.

Token module 670 may be configured to receive from the user at the payment location, a token. The token module 670 may be further configured to provide such token in response to receiving a pre-payment.

Payment settlement module 680 may be configured to settle the pre- payment made by the vehicle using the selected payment instrument.

Exemplary Computer System Overview

Figure 7:
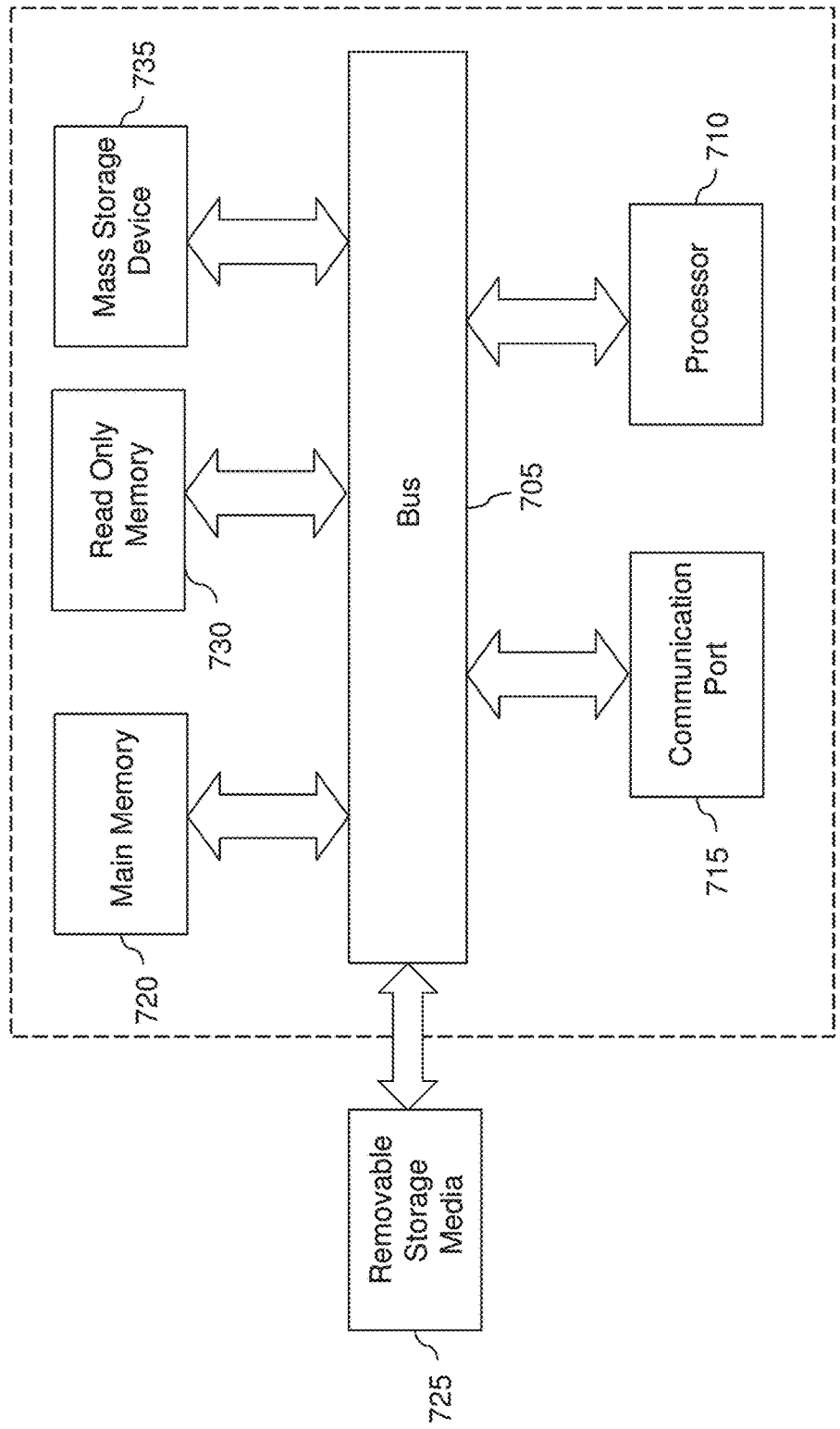
FIG. 7 illustrates an example of a computer system within which some embodiments of the present invention may be utilized.

Embodiments of the present invention include various steps and operations. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 7 is an example of a computer system 700 with which embodiments of the present invention may be utilized. According to the present example, the computer system includes a bus 705, at least one processor 710, at least one communication port 715, a main memory 720, a removable storage media 725, a read only memory 730, and a mass storage 735.

Processor(s) 710 can be any known processor, such as, but not limited to, an Intel® Itanium® or Itanium 2® processor(s), or AMD® Opteron® or Athlon MP® processor(s), or Motorola ® lines of processors. Communication port(s) 715 can be any of an RS-232 port for use with a modem based dialup connection, a 10/100 Ethernet port, or a Gigabit port using copper or fiber. Communication port(s) 715 may be chosen depending on a network such a Local Area Network (LAN), Wide Area Network (WAN), or any network to which the computer system 700 connects.

Main memory 720 can be Random Access Memory (RAM), or any other dynamic storage device(s) commonly known in the art. Read only memory 730 can be any static storage device(s) such as Programmable Read Only Memory (PROM) chips for storing static information such as instructions for processor 710.

Mass storage 735 can be used to store information and instructions. For example, hard disks such as the Adaptec® family of SCSI drives, an optical disc, an array of disks such as RAID, such as the Adaptec family of RAID drives, or any other mass storage devices may be used.

Bus 705 communicatively couples processor(s) 710 with the other memory, storage and communication blocks. Bus 705 can be a PCI /PCI-X or SCSI based system bus depending on the storage devices used.

Removable storage media 725 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM).

The components described above are meant to exemplify some types of possibilities. In no way should the aforementioned examples limit the scope of the invention, as they are only exemplary embodiments.

Terminology

Brief definitions of terms used throughout this application are given below.

The terms "connected" or "coupled" and related terms are used in an operational sense and are not necessarily limited to a direct connection or coupling.

The term "embodiments," phrases such as "in some embodiments," "in various embodiments," and the like, generally mean the particular feature(s), structure(s), method(s), or characteristic(s) following or preceding the term or phrase is included in at least one embodiment of the present invention, and may be included in more than one embodiment of the present invention. In addition, such terms or phrases do not necessarily refer to the same embodiments.

If the specification states a component or feature "may", "can", "could", or "might" be included or have a characteristic, that particular component or feature is not required to be included or have the characteristic.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, and/or a module can include one or more application programs.

The term "responsive" includes completely and partially responsive.

Various embodiments of the present invention may be implemented using a combination of one or more modules. For example, some embodiments provide for a graphical user interface module to generate one or more graphical user interface screens configured to take instructions, receive design objectives, and convey results, a general-purpose or special-purpose "communications module" for interfacing with one or more other modules and devices (e.g,. a fabrication device or fabrication control module), a "design module" to receive and process a set of constraints that mathematically express the design objectives, computation and fabrication limitations, a "fabrication module" to control the fabrication devices in order to fabricate the devices using liquid deposition photolithography, as well as other modules for providing various functionality needed by embodiments of the present invention. Still yet, some embodiments may incorporate two or more of these modules into a single module and/or associate a portion of the functionality of one or more of these modules with a different module.

Various modifications and additions can be made to the embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations and all equivalents thereof.

What is claimed is:

1. A method comprising:
   linking a vehicle mobile wallet to a vehicle programmed to enable in-vehicle purchasing by a user;
   presenting, on a user interface of the vehicle, payment locations to the user,
      wherein the payment locations correspond to one or more items available for purchase,
      wherein the payment locations are within a proximity of the vehicle;
   receiving, in the user interface of the vehicle, a user selection of a payment location of a merchant;
   receiving, in the user interface of the vehicle, a pre-payment authorization from the user corresponding to the one or more items available for purchase at the payment location of the merchant using at least one payment instrument from the vehicle mobile wallet for settlement of a pre-payment;
   in response to the pre-payment being received by the payment location, providing to the vehicle mobile wallet a pre-payment token for the user; and
   transmitting, from the vehicle mobile wallet, the pre-payment token to the merchant for the user to receive the one or more items at the vehicle from the merchant, wherein the pre-payment token received by the merchant includes a user-specific identifier of personal information of the user.

2. The method of claim 1, further comprising:
   determining the one or more items available for purchase at the payment location;
   providing the user with a selectable list of two or more of the one or more items available for purchase at the payment location;
   receiving a selection of at least one of the one or more items available for purchase at the payment location; and
   providing a total cost associated with the selection of the at least one of the one or more items available for purchase at the payment location.

3. The method of claim 1, wherein the pre-payment identifies the at least one payment instrument to the payment location via the vehicle mobile wallet.

4. The method of claim 1, wherein the pre-payment token is presented at the payment location to complete the purchase by verifying the pre-payment corresponding to the one or more items.

5. The method of claim 1, further comprising:
   settling the pre-payment using the one of the at least one payment instrument.

6. The method of claim 1, wherein the pre-payment identifier token changes on a per-transaction basis, and wherein the pre-payment identifier token includes a membership number associated with the user.

7. The method of claim 1, wherein the vehicle mobile wallet is linked to the vehicle from a mobile device via near-field communication.

8. A non-transitory computer-readable medium storing instructions that, when executed by a computing system, cause the computing system to perform operations comprising:
   linking a vehicle mobile wallet to a vehicle programmed to enable in-vehicle purchasing by a user;
   presenting, on a user interface of the vehicle, payment locations to the user, wherein the payment locations correspond to one or more items available for purchase, wherein the payment locations are within a proximity of the vehicle;
   receiving, in the user interface of the vehicle, a user selection of a payment location of a merchant;
   receiving, in the user interface of the vehicle, a pre-payment authorization from the user corresponding to the one or more items available for purchase at the payment location of the merchant using at least one payment instrument from the vehicle mobile wallet for settlement of a pre-payment;
   in response to the pre-payment being received by the payment location, providing to the vehicle mobile wallet a pre-payment identifier token for the user; and
   transmitting, from the vehicle mobile wallet, sending the pre-payment identifier token to the merchant for the user to receive the one or more items at the vehicle from the merchant, wherein the pre-payment token received by the merchant includes a user-specific identifier of personal information of the user.

9. The non-transitory computer-readable medium of claim 8, wherein the operations further comprise:
   determining the one or more items available for purchase at the payment location;
   providing the user with a selectable list of two or more of the one or more items available for purchase at the payment location;
   receiving a selection of at least one of the one or more items available for purchase at the payment location; and
   providing a total cost associated with the selection of the at least one of the one or more items available for purchase at the payment location.

10. The non-transitory computer-readable medium of claim 8, wherein the pre-payment identifies the at least one payment instrument to the payment location via the vehicle mobile wallet.

11. The non-transitory computer-readable medium of claim 8, wherein the pre payment identifier is a token, wherein the pre-payment token is presented at the payment location to complete the purchase by verifying the pre-payment corresponding to the one or more items.

12. The non-transitory computer-readable medium of claim 8, wherein the operations further comprise:
  settling the pre-payment using the one of the at least one payment instrument.

13. The non-transitory computer-readable medium of claim 8, wherein the pre-payment identifier token changes on a per-transaction basis, and wherein the pre-payment identifier token includes a membership number associated with the user.

14. The non-transitory computer-readable medium of claim 8, wherein the vehicle mobile wallet is linked to the vehicle from a mobile device via near-field communication.

15. A system comprising:
  one or more processors; and
  one or more memories storing instructions that, when executed by the one or more processors, cause the system to perform a process comprising:
    linking a vehicle mobile wallet to a vehicle programmed to enable in-vehicle purchasing by a user;
    presenting, on a user interface of the vehicle, payment locations to the user, wherein the payment locations correspond to one or more items available for purchase, wherein the payment locations are within a proximity of the vehicle;
    receiving, in the user interface of the vehicle, a user selection of a payment location of a merchant;
    receiving, in the user interface of the vehicle, a pre-payment authorization from the user corresponding to the one or more items available for purchase at the payment location of the merchant using at least one payment instrument from the vehicle mobile wallet for settlement of a pre-payment;
    in response to the pre-payment being received by the payment location, providing to the vehicle mobile wallet a pre-payment identifier token for the user; and
    transmitting, from the vehicle mobile wallet, Lending the pre-payment identifier token to the merchant for the user to receive the one or more items at the vehicle from the merchant, wherein the pre-payment token received by the merchant includes a user-specific identifier of personal information of the user.

16. The system according to claim 15, wherein the process further comprises:
  determining the one or more items available for purchase at the payment location;
  providing the user with a selectable list of two or more of the one or more items available for purchase at the payment location;
  receiving a selection of at least one of the one or more items available for purchase at the payment location; and
  providing a total cost associated with the selection of the at least one of the one or more items available for purchase at the payment location.

17. The system according to claim 15, wherein the pre-payment identifies the at least one payment instrument to the payment location via the vehicle mobile wallet.

18. The system according to claim 15, wherein the pre payment identifier is a token, wherein the pre-payment token is presented at the payment location to complete the purchase by verifying the pre-payment corresponding to the one or more items.

19. The system according to claim 15, wherein the process further comprises:
  settling the pre-payment using the one of the at least one payment instrument.

20. The system according to claim 15, wherein the pre-payment identifier token changes on a per-transaction basis, wherein the pre-payment identifier token includes a membership number associated with the user, and wherein the vehicle mobile wallet is linked to the vehicle from a mobile device via near-field communication.

\* \* \* \* \*